(12) United States Patent
Hou et al.

(10) Patent No.: US 6,483,459 B1
(45) Date of Patent: Nov. 19, 2002

(54) DIRECTION OF ARRIVAL ANGLE TRACKING ALGORITHM FOR SMART ANTENNAS

(75) Inventors: Weiguang Hou, Wichita, KS (US); Hyuck M. Kwon, Wichita, KS (US)

(73) Assignee: NeoReach, Inc., Rockville, MD (US)

( * ) Notice: Subject to any disclaimer, the term of this patent is extended or adjusted under 35 U.S.C. 154(b) by 0 days.

(21) Appl. No.: 09/826,100

(22) Filed: Apr. 5, 2001

(51) Int. Cl.[7] .................................................. G01S 3/02
(52) U.S. Cl. ........................................ 342/378; 342/453
(58) Field of Search ................................. 342/453, 378, 342/380, 383; 455/456

(56) References Cited

U.S. PATENT DOCUMENTS 6,148,023 A * 11/2000 Pelin et al. ................. 375/206
6,347,234 B1 * 2/2002 Scherzer ..................... 455/562

\* cited by examiner

Primary Examiner—Theodore M. Blum
(74) Attorney, Agent, or Firm—Piper Rudnick, LLP; Steven B. Kelber; James M. Heintz

(57) ABSTRACT

Recently, a smart antenna, i.e., a blind adaptive antenna array, has attracted much attention to suppress multiple access interference (MAI) and multipath signals to improve the capacity of a code division multiple access (CDMA) wireless communications system. Most of the smart antenna algorithms either need matrix computation or complex calculations. In this invented direction-of-arrival (DOA) tracking algorithm only 2M complex multiplications are required per snapshot. Further more the DOA tracking algorithm is not sensitive to the mixer phase distortions. Hence the system complexity is reduced since a separate phase calibration is not required for the DOA tracking algorithm. Also the equivalent DOA tracking error due to the mixer phase distortions is derived. Simulation results show that the DOA tracking algorithm in the present invention works effectively under additive white Gaussian (AWGN) as well as Rayleigh fading environments. Also the system employing the invented smart antenna has the same bit error rate (BER) performance as those of other existing smart antennas, however, has less computation burdens and complexity.

48 Claims, 9 Drawing Sheets

DIRECTION OF ARRIVAL ANGLE TRACKING ALGORITHM FOR SMART ANTENNAS

BACKGROUND OF THE INVENTION

1. Field of the Invention

The present invention relates to wireless telecommunications in general and more particularly to a method and system for determining a direction of arrival angle with a smart antenna in a wireless telecommunications system.

2. Related Art

A smart antenna, such as a blind adaptive antenna array, is a method and system used to enhance a desired user signal, to suppress multiple access interfering signals, and in general to improve the performance of a wireless communications system, including CDMA systems such as third generation (3G) wireless communication systems, particularly those specified in the wide band CDMA (W-CDMA) or the CDMA2000 standards. In such systems, smart antenna technology may optionally be employed at a base station. A smart antenna can suppress interfering signals of different DOAs (Directions of Arrival) by using spatial diversity. Smart antenna technologies attract much attention these days as they support more users with a high quality of service and high data rates. Efficient smart antenna schemes have appeared recently. It is desirable that a smart antenna be effectively easy to implement.

The DOA tracking capability, convergence, and computation complexity are very important issues in the design of the smart antennas. Conventional methods for determining the direction of arrival of an incoming signal in a smart antenna system require matrix computation or complex computation, which are the costly parts of the smart antenna tracking algorithms. Specifically, known algorithms attempt to calculate the weight vectors directly by minimizing or maximizing some cost criteria such as SINR (signal to interference+noise ratio), BER (bit error rate) or MSE (mean square error). These methods require determining a separate weight vector for each antenna element; e.g., if there are six antenna elements, six unknown variables must be determined. Another drawback associated with known methods is that practical embodiments of these methods require calibration of mixer phase distortions.

SUMMARY OF THE INVENTION

The aforementioned needs are addressed to a great extent by the present invention, which provides a method and system for performing an initial DOA estimate and fine-tuning the estimate and for tracking the DOA when there is relative motion between the transmitter and receiver. The present invention utilizes the notion that the maximum antenna gain can be achieved when the weight vector for the antenna array is matched to the array response vector. In highly preferred embodiments, rather than attempting to calculate the weight vectors directly as is done in conventional algorithms, the present invention estimates a DOA angle and calculates the weight vectors as a function of the estimated DOA angle. The estimated DOA angle is then adaptively updated to optimize correlation output, e.g., to achieve the maximum output power or maximum signal-to-interference-plus-noise-ratio (SINR) for the desired user. This method may be used during both the initial search for the DOA, in which a coarse adjustment is made to the estimated DOA angle, and for tracking the DOA as relative movement between the transmitter and the receiver occurs, in which a fine adjustment is made. The proposed algorithm of the present invention is not sensitive to mixer phase distortions. Thus, a separate phase calibration is not required in the system. The proposed algorithm also has lower computational burdens, as compared to conventional algorithms, for calculating weight vectors for smart antenna arrays, thereby lowering the complexity and cost of a system.

BRIEF DESCRIPTION OF THE DRAWINGS

The aforementioned advantages and features of the present invention will be more readily understood with reference to the following detailed description and the accompanying drawings in which.

DETAILED DESCRIPTION OF THE PREFERRED EMBODIMENT

In the following detailed description, numerous details, such as numbers and orientation of antennas in antenna arrays, are set forth in order to provide a more thorough understanding of the present invention. These details should not be understood to limit the invention.

The present invention is believed to be particularly useful in CDMA (code division multiple access) systems and thus will be discussed in that context below. However, the invention is applicable to other spread spectrum systems and is therefore not limited to CDMA systems. The following description discusses a linear antenna array applied to a base station, however, the invention is equally applicable to the mobile side. The present invention is applicable to any smart antenna system regardless of the shape of the antenna array.

Figure 1:
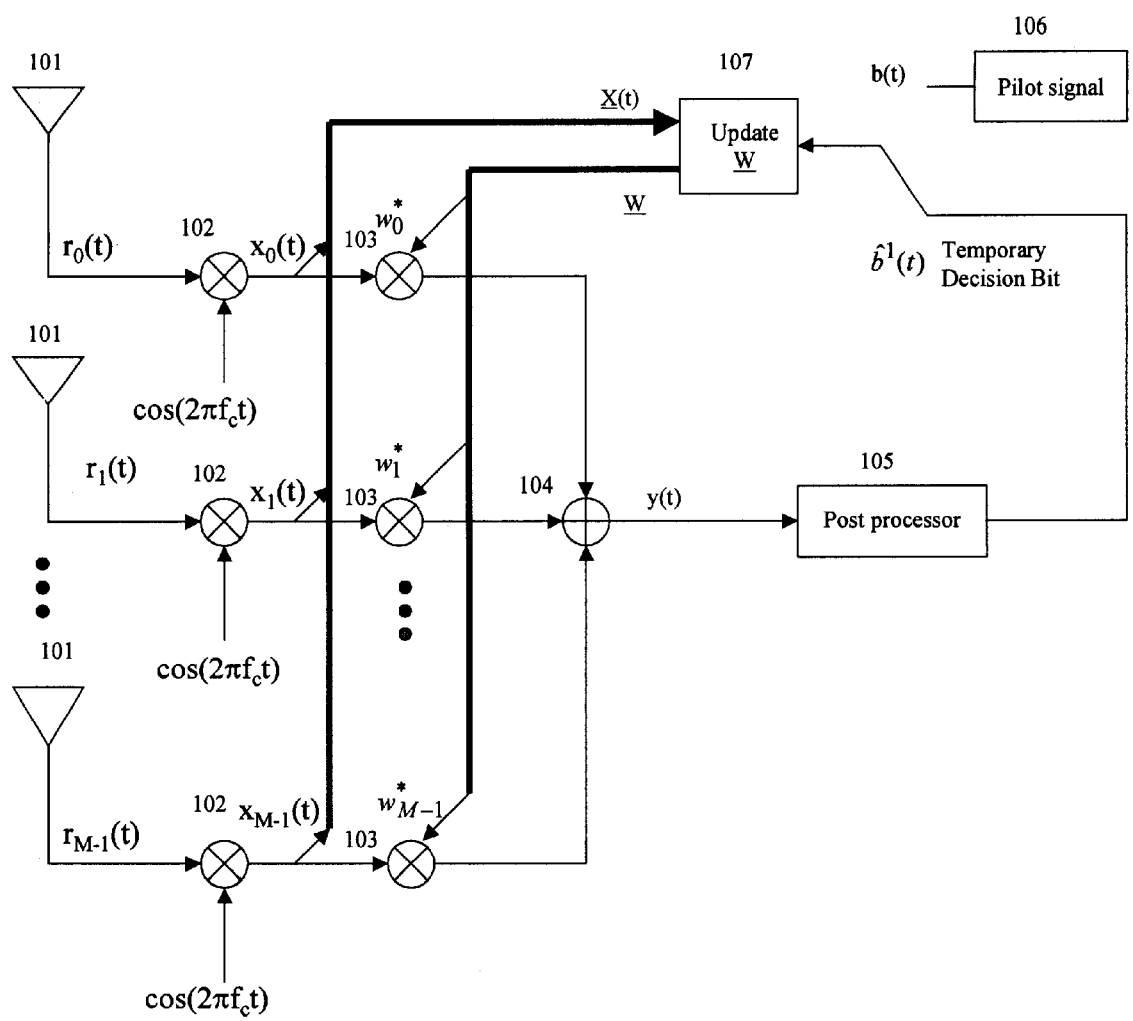
FIG. 1 is a block diagram of a complex pseudo-noise (PN) spread receiver for a CDMA communication system configured in accordance with one embodiment of the present invention.

FIG. 1 is an example receiver structure for a CDMA communication system with multiple user accesses. A linear antenna array with M omnidirectional elements is considered in this example. The transmitted signal from user k, using the baseband notation, can be written as $$s_k(t) = \sqrt{2P_k^t}\, a_k(t) b_k(t) \exp(j(2\pi f_c t + \varphi_k)) \tag{1}$$

where $P_k^t$, $\phi_k$, $f_c$, $a_k(t)$, and $b_k(t)$ are the transmitted power, phase, carrier frequency, PN chip sequence, and information data bit sequence for user k, respectively. The phase $\phi_k$ is slowly changing, compared to bit $b_k(t)$, and time variable for $\phi_k$ is dropped without loss of generality. Also, the snapshot rate for weight vector update and the change rate of the DOA angle $\theta$ are slower than the bit and chip rate. Therefore, time indices for the snapshot, weight vector, and DOA will be also dropped. The PN chip sequence can be written as $$a_k(t) = \sum_{j=-\infty}^{\infty} a_j^k P_{T_c}(t - jT_c) \tag{2}$$

where $a_j^k$ is the PN sequence for the $k^{th}$ user and $P_{T_c}(t)$ is a unit rectangular pulse of chip time interval $T_c$ written as $$P_{T_c}(t) = \begin{cases} 1 & 0 \leq t \leq T_c \\ 0 & \text{otherwise.} \end{cases} \tag{3}$$

The information data signal can be written as $$b_k(t) = \sum_{l=-\infty}^{\infty} b_l^k P_{T_b}(t - lT_b) \tag{4}$$

where $b_l^k$ is the l-th data bit for user k and $P_{T_b}(t)$ is a unit rectangular pulse of bit time interval $T_b$ written as $$P_{T_b}(t) = \begin{cases} 1 & 0 \leq t \leq T_b \\ 0 & \text{otherwise.} \end{cases} \tag{5}$$

Let k=1 denote the desired user signal index and all radio frequency mixers have the same characteristics at the receiver. Then, the complex signal received at the $m^{th}$ antenna element, m=0,1, ..., M−1, can be written as $$r_m(t) = \sqrt{2P_1}\, a_1(t) b_1(t) \alpha_1 \exp\left(j\left(2\pi f_c t + \varphi_1 - \frac{2\pi dm}{\lambda}\sin\theta_1\right)\right) + \sum_{k=2}^{K} \sqrt{2P_k}\, a_k(t - \tau_k) b_k(t - \tau_k) \alpha_k \exp\left(j\left(2\pi f_c t + \varphi_k + \delta_k - \frac{2\pi dm}{\lambda}\sin\theta_k\right)\right) + n_m(t) \tag{6}$$

where m=0 is the reference antenna element (101) in FIG. 1, d is the distance between the two adjacent antenna elements, $\lambda$ is the wavelength of the carrier frequency, $\alpha_k$, $\delta_k$, and $\tau_k$ are the amplitude, phase, and delay for the $k^{th}$ user, respectively, and the bandpass noise $n_m(t)$ at the $m^{th}$ element can be written as $$n_m(t) = n_{m,c}(t)\cos 2\pi f_c t - n_{m,s}(t)\sin 2\pi f_c t. \tag{7}$$

Since coherent demodulation is assumed for the desired user 1, $\delta_1$ is set to zero.

The down converted signal at the $m^{th}$ antenna element is denoted by $x_m(t)$ and can be written as $$x_m(t) = \sqrt{\frac{P_1}{2}}\, a_1(t) b_1(t) \alpha_1 \exp\left(-j\left(\frac{2\pi dm}{\lambda}\sin\theta_1\right)\right) + \sum_{k=2}^{K} \sqrt{\frac{P_k}{2}}\, a_k(t - \tau_k) b_k(t - \tau_k) \alpha_k \exp\left(j\left(\varphi_k + \delta_k - \frac{2\pi dm}{\lambda}\sin\theta_k\right)\right) + n_m(t) \tag{8}$$

and the complex baseband AWGN $\eta_m(t)$ is given by $$\eta_m(t) = n_{m,c}(t) + j n_{m,s}(t). \tag{9}$$

Each antenna element output $r_m(t)$ after carrier down conversion (102) in FIG. 1 is multiplied by a complex weight coefficient $w_m$, m=0,1, ..., M−1 (103) and then summed to produce the antenna array output y(t) (104), by assuming that an ideal low pass filter is applied to remove the double frequency term. Zero phase distortions at the mixers are assumed for simplicity. Analysis including the mixer phase distortions will be presented at the end of the present invention description. The antenna array output can be written as $$y(t) = \underline{W}^H \underline{X} = \sum_{m=0}^{M-1} w_m^* x_m(t) \tag{10}$$

and $$\underline{W} = [w_0, w_1, \ldots, w_{M-1}]^T \tag{11}$$

$$\underline{X} = [x_0, x_1, \ldots, x_{M-1}]^T \tag{12}$$

where H and T are the conjugate transpose (i.e., Hermitian) and transpose, respectively. Assume perfect PN code synchronization for simplicity. When a weight vector is optimized, the antenna array will yield a beam pattern towards the desired user signal and suppress interfering signals of different arrival angles.

The weight vector of the linear antenna array is normalized to have a unit norm, i.e., $\underline{W}^H \underline{W} = 1$. When the antenna array weight vector is perfect for the desired user signal, the weight vector can be written as $$\underline{W} = \frac{1}{\sqrt{M}}\left[1, e^{-j\frac{2\pi d}{\lambda}\sin\theta_1}, \ldots, e^{-j\frac{2\pi d(M-1)}{\lambda}\sin\theta_1}\right]^T. \tag{13}$$

The antenna array response vector a is the same as the perfect weight vector in equation (13). Because the antenna elements are in a linear array with space d, the antenna array output y(t) would be $$y(t) = \underline{W}^H \underline{X}(t) = \sqrt{\frac{MP_1}{2}}\, a_1(t) b_1(t) \alpha_1 + \xi(t) + \gamma(t) \tag{14}$$

where $\xi(t)$ and $\gamma(t)$ are the interference signals due to the other users and the noise component, respectively, and can be written as $$\xi(t) = \frac{1}{\sqrt{M}} \sum_{m=0}^{M-1} \left[ \sum_{k=2}^{K} \sqrt{\frac{P_k}{2}} a_k(t-\tau_k) b_k(t-\tau_k) \alpha_k \times \right.$$
$$\left. \exp\left( j\left( \varphi_k + \delta_k + \frac{2\pi dm}{\lambda}(\sin\theta_1 - \sin\theta_k) \right) \right) \right]$$ (15)

$$\gamma(t) = \frac{1}{\sqrt{M}} \sum_{m=0}^{M-1} \{n_{m,c}(t) + j n_{m,s}(t)\} \exp\left( j \frac{2\pi dm}{\lambda} \sin\theta_1 \right)$$ (16)

It is observed from equation (14) that when the weight vector is perfectly matched with the array response vector in the right hand side of equation (13), the receiver with a linear antenna array will have an amplitude gain of $M^{1/2}$, i.e., the received signal power with M antenna elements will be M times stronger than that with a single antenna receiver. For other kinds of antenna arrays, e.g., circular or square arrays, etc., the same maximum antenna gain can be achieved when the weight vector is perfectly matched with the array response vector. The present invention can be applied to the other antenna arrays without loss of generality. The smart antenna output y(t) is fed to the successive post processor (105), e.g., demodulator, to retrieve the user data bit information.

We observe that γ(t) is a Gaussian random process and the mean of γ(t) is $$E\{\gamma(t)\} = E\left\{ \frac{1}{\sqrt{M}} \sum_{m=0}^{M-1} [n_{m,c}(t) + j n_{m,s}(t)] \exp\left( j \frac{2\pi dm}{\lambda} \sin\theta_1 \right) \right\}$$ (17)

$$= \frac{1}{\sqrt{M}} \sum_{m=0}^{M-1} [E\{n_{m,c}(t)\} + j E\{n_{m,s}(t)\}] \exp\left( j \frac{2\pi dm}{\lambda} \sin\theta_1 \right) = 0,$$ (18)

and the variance of γ(t) is given as $$E\{\gamma(t)\gamma^*(t)\} = \frac{1}{M} E\left\{ \left[ \sum_{m=0}^{M-1} (n_{m,c}(t) + j n_{m,s}(t)) \exp\left( j \frac{2\pi dm}{\lambda} \sin\theta_1 \right) \right] \times \right.$$
$$\left. \left[ \sum_{m=0}^{M-1} (n_{m,c}(t) + j n_{m,s}(t)) \exp\left( j \frac{2\pi dm}{\lambda} \sin\theta_1 \right) \right]^* \right\}$$ (19)

$$= \frac{1}{M} \left[ \sum_{m=0}^{M-1} E\{n_{m,c}^2(t)\} + \sum_{m=0}^{M-1} E\{n_{m,s}^2(t)\} \right] = 2\sigma_n^2.$$ (20)

where $\sigma_n^2 = \text{var}(n_{m,c}(t)) = \text{var}(n_{m,c}(t)) = N_0/2$ is the variance of the AWGN thermal noise.

Most of the existing smart antenna algorithms update the weight vector $\underline{W} = [w_0, w_1, \ldots, w_{M-1}]^T$ so that the weight vector minimizes or maximizes a cost or criteria function, e.g., minimizes a mean-square-error (MSE), minimizes a bit error rate (BER), or maximizes SINR. There are M unknown variables in the weight vector $\underline{W}$. Instead of trying to find the M unknown variables, the present invention updates the DOA $\theta_1$ for user 1 and simply uses the estimate $\hat{\theta}_1$ in equation (13) to calculate a weight vector. Only one variable $\hat{\theta}_1$ is updated instead of M variables. The present invention presents a method to find the optimum estimate $\hat{\theta}_1$ adaptively to maximize correlation output with the tentative decision feedback bit. Two different step sizes Δθ will be employed for the updating in the preferred embodiment. For the initial search, a large step size will be employed, and for the tracking a fine step size will be employed. Thus, the weight vector (107) using an estimated DOA $\hat{\theta}_1$ for user 1 can be written as $$\hat{\underline{W}} = \frac{1}{\sqrt{M}} \left[ 1, e^{-j\frac{2\pi d}{\lambda}\sin\hat{\theta}_1}, \ldots, e^{-j\frac{2\pi d(M-1)}{\lambda}\sin\hat{\theta}_1} \right]^T.$$ (21)

Then the antenna array output signal ŷ(t) (104) can be written as $$\hat{y}(t) = \sum_{m=0}^{M-1} \hat{w}_m^* x_m(t) = S(t) + MA(t) + N(t)$$ (22)

$$S(t) = \sum_{m=0}^{M-1} \sqrt{\frac{P_1}{2M}} a_1(t) b_1(t) \alpha_1 \exp\left( j\left( \frac{2\pi dm}{\lambda} \sin\hat{\theta}_1 - \frac{2\pi dm}{\lambda} \sin\theta_1 \right) \right)$$ (23)

$$MA(t) = \sum_{m=0}^{M-1} \sum_{k=2}^{K} \sqrt{\frac{P_k}{2M}} a_k(t) b_k(t)$$
$$\alpha_k \exp\left( j\left( \varphi_k + \delta_k + \frac{2\pi dm}{\lambda} \sin\hat{\theta}_1 - \frac{2\pi dm}{\lambda} \sin\theta_k \right) \right)$$ (24)

$$N(t) = \frac{1}{\sqrt{M}} \sum_{m=0}^{M-1} n_m(t) \exp\left( \frac{2\pi dm}{\lambda} \sin\hat{\theta}_1 \right)$$ (25)

where S(t), MA(t), and N(t) represent the signal, multiple access interference, and thermal noise component, respectively. The output ŷ(t) is despread with the desired user's PN sequence $a_1(t)$. The signal component of the despread output sampled for the $l^{th}$ bit can be written as $$S(lT_b) = \int_{lT_b}^{(l+1)T_b} S(t) a_1(t) dt$$ (26)

$$= \sqrt{\frac{P_1}{2M}} R_1 b_l^1 \alpha_1 \sum_{m=0}^{M-1} \exp\left( j\left( \frac{2\pi dm}{\lambda} \sin\hat{\theta}_1 - \frac{2\pi dm}{\lambda} \sin\theta_1 \right) \right)$$

$$= \sqrt{\frac{P_1}{2M}} R_1 b_l^1 \alpha_1 \frac{1 - e^{j\frac{2\pi dM}{\lambda}(\sin\hat{\theta}_1 - \sin\theta_1)}}{1 - e^{j\frac{2\pi d}{\lambda}(\sin\hat{\theta}_1 - \sin\theta_1)}}$$ (27)

where $$R_1 = \int_{lT_b}^{(l+1)T_b} a_1(t) a_1(t) dt = T_b.$$ (28)

When the adaptive estimation $\hat{\theta}_1$ approaches $\theta_1$, the desired signal component $S(lT_b)$ for the $l^{th}$ bit can be written as $$S(lT_b) = \lim_{\hat{\theta}_1 \to \theta_1} \sqrt{\frac{P_1}{2M}} R_1 b_l^1 \alpha_1 \frac{1 - e^{j\frac{2\pi dM}{\lambda}(\sin\hat{\theta}_1 - \sin\theta_1)}}{1 - e^{j\frac{2\pi d}{\lambda}(\sin\hat{\theta}_1 - \sin\theta_1)}}$$ (29)

$$= \sqrt{\frac{MP_1}{2}} R_1 b_l^1 \alpha_1.$$

The interference and thermal noise component of the despread output sampled for the $l^{th}$ bit can be written as $$MA(lT_b) = \int_{lT_b}^{(l+1)T_b} MA(t)a_1(t)dt = \qquad (30)$$

$$\sum_{k=2}^{K} \sqrt{\frac{P_k}{2M}} R_{1k}\alpha_k \exp(j(\varphi_k + \delta_k)) \frac{1-e^{j\frac{2\pi dM}{\lambda}(\sin\hat{\theta}_1 - \sin\theta_k)}}{1-e^{j\frac{2\pi d}{\lambda}(\sin\hat{\theta}_1 - \sin\theta_k)}}$$

and $$N(lT_b) = \frac{1}{\sqrt{M}}\int_{lT_b}^{(l+1)T_b} N(t)a_1(t)dt = \qquad (31)$$

$$\frac{1}{\sqrt{M}}\sum_{m=0}^{M-1}\exp\left(j\frac{2\pi dm}{\lambda}\sin\hat{\theta}_1\right)\int_{lT_b}^{(l+1)T_b} n_m(t)a_1(t)dt$$

where $$R_{1k} = \int_{lT_b}^{(l+1)T_b} a_k(t-\tau_k)a_1(t)b_k(t)dt. \qquad (32)$$

The real part of the despread output at the sampling time instance $(l+1)T_b$ is preferably used instead of the magnitude. Let $Y1(lT_b)$ denote the real part of the weighted and despread correlation output. Then, $$Y1(lT_b) = Re\{S(lT_b) + MA(lT_b) + N(lT_b)\}. \qquad (33)$$

The $MA(lT_b)$ and $N(lT_b)$ have zero means, i.e., $$E\{MA(lT_b)\} = 0 \qquad (34)$$

$$E\{N(lT_b)\} = 0. \qquad (35)$$

Figure 2:
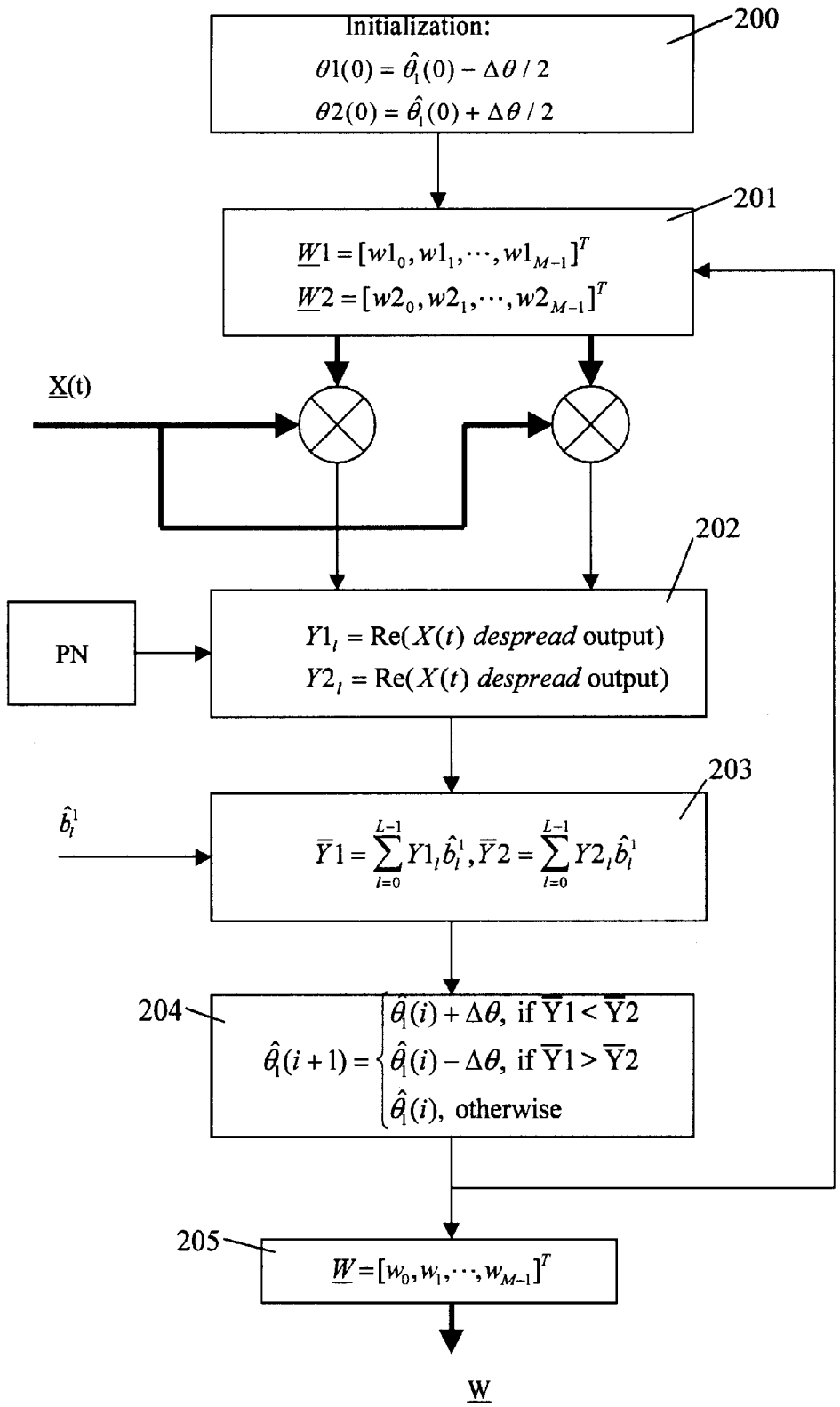
FIG. 2 is a flow chart of a proposed adaptive DOA tracking algorithm in accordance with one embodiment,of the present invention.
Figure 3:
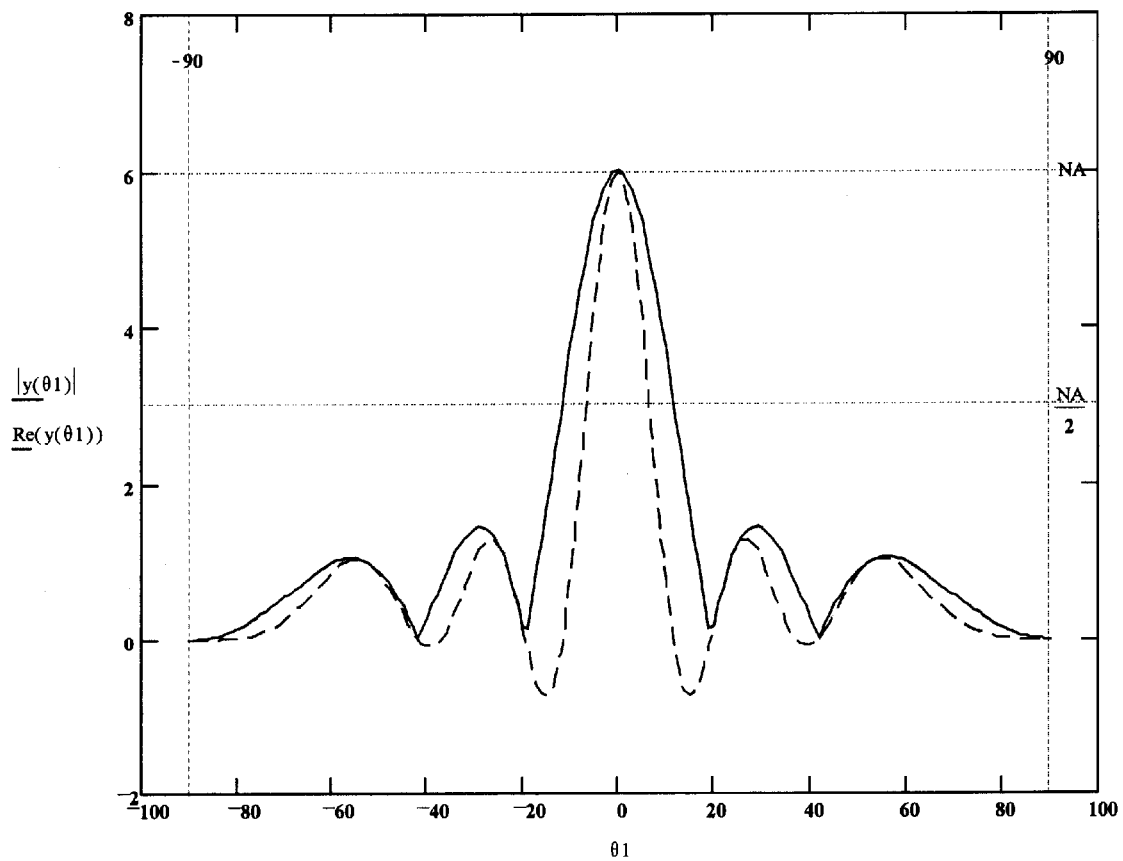
FIG. 3 is a beam pattern for an M=6 elements antenna array system and DOA=0°, configured in accordance with one embodiment of the present invention.
Figure 4:
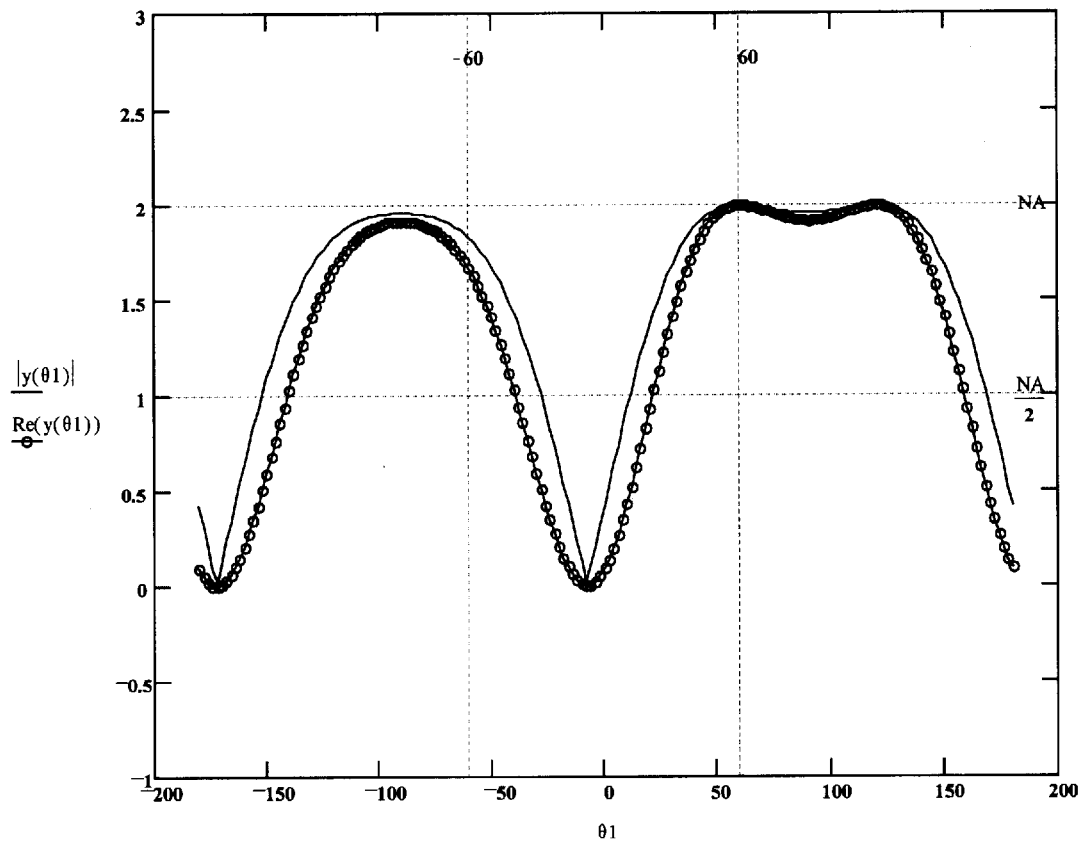
FIG. 4 is a beam pattern for an M=2 elements antenna array system and DOA=60°, configured in accordance with one embodiment of the present invention.

Let $\overline{Y}1$ denote the expectation of the real part of the despread output multiplied by the decision feedback bit $\hat{b}_l^1$. Then, $\overline{Y}1$ can be written as $$\overline{Y}1(\theta_1, \hat{\theta}_l) = E\{Y1(lT_b)\hat{b}_l^1\} \qquad (36)$$

$$= E\{Re\{S(lT_b)\hat{b}_l^1 + MA(lT_b)\hat{b}_l^1 + N(lT_b)\hat{b}_l^1\}\} \qquad (37)$$

$$= Re\{S(lT_b)\hat{b}_l^1\} \qquad (38)$$

$$\overline{Y}1(\theta_1, \hat{\theta}_1) = E\{Y1(lT_b)\hat{b}_l^1\} \qquad (36)$$

$$= E\{Re\{S(lT_b)\hat{b}_l^1 + MA(lT_b)\hat{b}_l^1 + N(lT_b)\hat{b}_l^1\}\} \qquad (37)$$

$$= Re\{S(lT_b)\hat{b}_l^1\} \qquad (38)$$

$$= Re\left\{\sqrt{\frac{P_1}{2N}} R_1 b_l^1 \alpha_1 \frac{1-e^{j\frac{2\pi dM}{\lambda}(\sin\hat{\theta}_1 - \sin\theta_1)}}{1-e^{j\frac{2\pi d}{\lambda}(\sin\hat{\theta}_1 - \sin\theta_1)}} \hat{b}_l^1 \right\} \qquad (39)$$

$$= Re\left\{\sqrt{\frac{P_1}{2N}} R_1 \alpha_1 \frac{1-e^{j\frac{2\pi dM}{\lambda}(\sin\hat{\theta}_1 - \sin\theta_1)}}{1-e^{j\frac{2\pi d}{\lambda}(\sin\hat{\theta}_1 - \sin\theta_1)}}\right\} \qquad (40)$$

if $\hat{b}_l^1 b_l^1 = 1$. $\overline{Y}1(\theta_1, \hat{\theta}_l)$ is the function of $(\sin\theta_1 - \sin\hat{\theta}_1)$. FIGS. 3 and 4 show the shape of $\overline{Y}1$ except the amplitude difference, for a beam pattern of M=6 and M=2 elements, respecively, and DOA=0° and DOA=60°, respectively. The solid line is the corresponding magnitude of $E\{Y1(lT_b)\hat{b}_l^1\}$, and the dashed line is the real part of $E\{Y1(lT_b)\hat{b}_l^1\}$. The real part has a smaller beamwidth than that of the magnitude which means that the real part has better resolution on the DOA. After an intitial estimation of the DOA from the desired user is found, the DOA tracking algorithm such as in FIG. 2 is activated to track the desired user. As a result, the beam will focus on the desired user to keep the maximum correlation output using the antenna output.

If a pilot channel (106) is available in a CDMA system, the pilot channel signal may be used as the desired signal may be used to track the DOA of the desired user. The pilot channel signal amplitude may flunctuate under fading environment. This fading environment effect will be discussed below. If a pilot symbol pattern is available, the pilot pattern $b_l^1$, which is known to both the transmitter and the receiver, may be used; or the temporary decision feedback information bit $\hat{b}_l^1$ may be used for $b_l^1$. The decision feedback information bit $\hat{b}_l^1$ is the postprocessor (105) output, which is the binary demodulation output in the present invention.

FIG. 2 shows an example flow chart of the proposed adaptive DOA tracking algorithm which is used at the smart antenna weight vector update (107) in FIG. 1. Here the assumption is that the angle is changing slowly, compared to the bit rate. This is a reasonable assumption. For example, suppose a mobile station is 1 km away from a base station, its moving speed is 100 km/hour, the data rate is 9600 bits per second (bps), and the DOA changes 1.5 degrees. Then $(15 \cdot \pi \cdot 103 \cdot 3600 \cdot 9600)/(180 \cdot 100 \cdot 103) = 9047$ bits will have been transmitted during the 1.5 degree change of DOA. For higher data rate, more data bits can be transmitted. Suppose the weight vector is updated every 20 bits. Then, 450 updates can be made for 1.5 degree DOA change. We also assume zero angle spread for each multipath for simplicity.

If the DOA of the desired signal is known, then the weight vector can be automatically obtained by using, for example, equation (13). However, the DOA of the desired signal is usually changing due to the mobile movement. Hence an adaptive DOA tracking algorithm is desirable in practice. Assume a power control is used so that the received power from any user is approximately equal to the others, which is a reasonable assumption in practice. The antenna array output will have a peak output when the beam is pointing to the desired user and the PN spread processing gain is larger than the number of users.

The estimation $\hat{\theta}_1$ is updated as $$\hat{\theta}_1(i+1) = \hat{\theta}_l(i) + \Delta\theta \qquad (41)$$

where i denotes the update index. It is not nessessary to track the DOA at chip or bit rate since the DOA changes slowly, compared to the bit rate. When $\hat{\theta}_1 = \theta_l$, the weight vector is steered pointing to the desired user.

Preferred embodiments of the initial DOA estimation process (also referred to as the DOA acquisition process) and the DOA tracking process will now be discussed in further detail. As discussed above, the initial DOA estimation process is necessary when the base station does not know the DOA angle for a desired user. The goal of the DOA estimation process is to estimate the DOA such that the estimate falls within the main lobe of the transmitted signal. Generally, the process comprises the following steps: form an initial estimate of the DOA angle, calculate a weight vector using this initial estimate, obtain the correlator output over some period using the weight vector, and repeat the previous steps until the estimated DOA is acceptable (i.e., within the main lobe of the transmitted signal).

In one highly preferred embodiment, the estimated DOA angle is initialized to an angle corresponding to the sector boundary and then stepped (incremented or decremented, depending upon the initial estimate) by a coarse step $\Delta\theta$ until the entire sector has been traversed. It should be noted that what is meant by "an angle corresponding to a sector boundary" includes both an angle equal to the sector boundary as well as an angle approximately equal to the sector boundary, such as an angle that is within some fraction (e.g., one half) of a coarse step $\Delta\theta$ of the sector boundary. The coarse step increment $\Delta\theta$ is preferably set to one half of the beamwidth of the main lobe, as shown in the fifth column of Table 1 below. This is done to ensure that at least one of the initial estimates is within the main lobe such that the correlator output will exceed the correlator output for other angles corresponding to sidelobes. The initial estimate is used to obtain a trial set of weight vectors. The correlator output is then obtained using the trial weight vectors over one bit (symbol) period. The estimated DOA angle is then updated, preferably every bit time interval, with a coarse step $\Delta\theta$. This process continues until the entire sector has been traversed. The angle with the largest correlator output is then chosen as the acquired DOA and the tracking algorithm begins. The number of steps to search 180 degrees (it is not necessary to search through 180 degrees where a sector size is smaller, such as 120 degrees) is shown in Table 1 for different numbers of antenna elements. At most only about 25 iterations (25 bit time intervals) are required to bring the beam pattern pointing to the desired user from any worst initial angle. This method is especially effective in systems in which power control is not used.

Alternatively, rather than comparing correlator outputs for several DOA angles, comparing them to each other to choose the corresponding DOA angle, correlator outputs for estimated angles could be compared to a threshold. In such a scheme, the first estimated DOA angle with a correlator output exceeding the threshold is selected. For example, a first estimate DOA is made (this could be done using a random process, or the first estimate could correspond to a sector boundary as discussed above) and the corresponding correlator compared to the threshold. If the threshold is exceeded, that angle forms the initial estimate and the tracking process begins. Otherwise, the estimated angle is updated again (either randomly or by the coarse step size) and the process continues until the threshold is crossed.

Table 1 shows example antenna array beam pattern parameters, for a 180° search range, where the number of antenna elements varies from 2 to 10.

TABLE 1

Antenna array beam pattern parameters

| Number of antenna elements | Angle error (in degrees) | Amplitude Relative to the maximum gain | Number of steps in the 180° search range during the initial search period | $\Delta\theta$ (in degree) $\Delta$ main lobe beamwidth × ½ during the initial search period |
|---|---|---|---|---|
| 2 | 11.0 | 91.3% | 3 | 60 |
| 3 | 6.0 | 91.3% | 6 | 31.8 |
| 4 | 4.4 | 90.2% | 9 | 21.6 |
| 5 | 3.3 | 90.5% | 11 | 16.4 |
| 6 | 2.7 | 90.3% | 14 | 13.2 |
| 7 | 2.3 | 90% | 17 | 11 |
| 8 | 1.9 | 90.8% | 19 | 9.6 |
| 9 | 1.7 | 90.5% | 22 | 8.4 |
| 10 | 1.5 | 90.7% | 25 | 7.4 |

When an acceptable estimated DOA is acquired, the DOA tracking algorithm is activated with a fine step increment $\Delta\theta$. The estimated DOA during the initial acquisition period used as the initial value for the fine tracking period. The choice of fine step increment $\Delta\theta$ depends on the number of antenna elements. Generally, the larger the number of antenna array elements is, the smaller the $\Delta\theta$ will be desirable. It is a function of the number of array elements M. In some embodiments, the fine step increment $\Delta\theta$ is set to 2° because the bit error rate is affected insignificantly by the beam direction error of 2° when an antenna array of M=2 elements is used. In other embodiments, the fine step increment $\Delta\theta$ is based on the angle error. In one highly preferred embodiment, the fine step increment is set to 10% of the angle error from Table 1 corresponding to the number of elements in the array.

Reference is made to FIG. 2. The estimated DOA ange is initialized for two trial angles at Step 200. The following is a preferred updating (tracking) procedure for $\hat{\theta}_1$ at the $i^{th}$ snapshot:

Step 201: Generate two sets of weight vectors W1 and W2 as shown in FIG. 2 with the estimated $\hat{\theta}_1$. Here the subscripts 1 and 2 represent two trial angles; early angle $\hat{\theta}_1-\Delta\theta/2$ and and late angle $\hat{\theta}_1+\Delta\theta/2$, respectively.

$$w1_m = \frac{1}{\sqrt{M}} e^{-j\frac{2\pi\lambda m}{d}\sin(\hat{\theta}_1-\frac{\Delta\theta}{2})}, \quad m = 0, 1, \ldots, M-1 \quad (42)$$

$$w2_m = \frac{1}{\sqrt{M}} e^{-j\frac{2\pi\lambda m}{d}\sin(\hat{\theta}_1+\frac{\Delta\theta}{2})}, \quad m = 0, 1, \ldots, M-1. \quad (43)$$

Step 202: Measure two despread outputs $Y1(lT_b)$ and $Y2(lT_b)$ in equation (33) at each sampling time instance $(l+1)T_b$ by using W1 and W2 respectively, and X in equation (12) and PN sequence.

Step 203: Take the average of $Y1(lT_b)\hat{b}_l^1$ and $Y2(lT_b)\hat{b}_l^1$ in equation (36) over L bit time intervals, $$\overline{Y1} = \frac{1}{L}\sum_{l=0}^{L-1} Y1(lT_b)\hat{b}_l^1 \quad (44)$$

$$\overline{Y2} = \frac{1}{L}\sum_{l=0}^{L-1} Y2(lT_b)\hat{b}_l^1. \quad (45)$$

Step 4: Update the estimated angle $\hat{\theta}_1$ as the following $$\hat{\theta}_1(i+1) = \begin{cases} \hat{\theta}_1(i) + \Delta\theta, & \text{if } \overline{Y1} < \overline{Y2} \\ \hat{\theta}_1(i) - \Delta\theta, & \text{if } \overline{Y1} > \overline{Y2} \\ \hat{\theta}_1(i), & \text{otherwise.} \end{cases} \quad (46)$$

In step (203) the time average is used to approximate the ensemble average in equation (36). At step 205, the weight W is updated using the new estimated angle.

The above-described tracking process (steps 201 to 204) ideally continues for as long as the incoming signal is received. However, under some circumstances, tracking may be lost, such as when the DOA may suddenly change due to a change in the environment, or the initial DOA estimate may correspond to a sidelobe rather than the main lobe. It is desirable to detect such events and to re-acquire the DOA by triggering the acquisition process. One indication that could be used to trigger the DOA acquisition process is that the received correlation output after despread is less than a threshold, e.g., 50% of the peak gain of the antenna array. Another scheme is to trigger the acquisition process when the bit error rate or the frame error rate (or some other signal quality measurement) crosses a threshold. A third scheme is to keep the acquisition process running in parallel and reinitialize the tracking process if the correlator output for any estimated angle exceeds the correlator output for the current angle determined by the tracking process.

In practical channel environments, the desired user signal may come from different DOAs with time delays. If the desired signals are from the same DOA with different time delays, then a RAKE receiver structure can be employed to collect the resolvable signals. If the desired signals are from different DOAs, several duplicate weight vector generators (107 in FIG. 1) can be employed to collect the desired user signals received from different resovable DOAs.

Fading

The proposed DOA tracking algorithm discussed above is still valid under Rayleigh fading environment. The reason is that the fading amplitude of the desired user only affects the amplitude of the despread output at each sampling instance. For a given DOA, if $Y1(lT_b) < Y2(lT_b)$, then $\alpha_{1,l} Y1(lT_b) < \alpha_{1,l} Y2(lT_b)$, since $\alpha_{1,l} > 0$. Even with $\alpha_{1,l}$ changing during L bit time interval, the following equality still holds:

$$\bar{Y}1 = \frac{1}{L}\sum_{l=0}^{L-1} \alpha_{1,l} Y1(lT_b) < \bar{Y}2 = \frac{1}{L}\sum_{l=0}^{L-1} \alpha_{1,l} Y2(lT_b). \tag{47}$$

Hence the DOA tracking procedure remains unchanged.

No Phase Calibrations

In a practical system, the characteristics of the mixers are different and they introduce different phase distortions at the mixers in general. Let $\psi_m$ be the phase distortion due to the $m^{th}$ mixer. Without loss of generality, $\psi_m$ is assumed to be uniformly distributed between $[-\Omega^\circ, +\Omega^\circ]$ and $\{\psi_m\}$ are independent. Including the mixer phase distortions, the signal component of the antenna array output after PN despreading can be written as $$S(lT_b) = \int_{lT_b}^{(l+1)T_b} S(t)a_1(t)dt \tag{48}$$

$$= \sqrt{\frac{P_1}{2M}} R_1 b_l^1 \alpha_1 \tag{49}$$

$$\sum_{m=0}^{M-1} \exp\left(j\left(\frac{2\pi dm}{\lambda}\sin\hat{\theta}_1 - \frac{2\pi dm}{\lambda}\sin\theta_1 + \psi_m\right)\right)$$

by using eqution (26).

When the beam pattern is pointing to the DOA of the desired user, the desired signal output of the antenna array can be written as $$S(lT_b) = \sqrt{\frac{P_1}{2M}} R_1 b_l^1 \alpha_1 \sum_{m=0}^{M-1} \exp(j\psi_m), \tag{50}$$

and $$\bar{Y}1 = E\{Re[S(lT_b)\hat{b}_l^1]\} \tag{51}$$

$$= \sqrt{\frac{P_1}{2M}} R_1 E\{\alpha_1\} E\left\{Re\left[\sum_{m=0}^{M-1} \exp(j\psi_m)\right]\right\}$$

$$= \sqrt{\frac{P_1}{2M}} R_1 E\{\alpha_1\} \sum_{m=0}^{M-1} E\{\cos\psi_m\} \tag{52}$$

$$= \sqrt{\frac{P_1}{2M}} R_1 E\{\alpha_1\} \sum_{m=0}^{M-1} \int_{-\Omega}^{\Omega} \frac{1}{2\Omega}\cos\psi_m d\psi_m \tag{53}$$

$$= \sqrt{\frac{P_1}{2M}} R_1 E\{\alpha_1\} M \frac{\sin\Omega}{\Omega}.$$

The degradation of the gain due to the mixer phase distortions is about $\sin\Omega/\Omega$. For example, when $\Omega=60°$, the degradation is only $10 \log(0.827) = -0.825$ dB. The angle error due to the mixer phase distortions depends on the number of the antenna array elements.

Let $\psi$ denote the equivalent DOA tracking error due to the mixer phase distortions, and $\theta_1$ and $\hat{\theta}_1$ be the true and the estimated DOA, respectively. Then, $\hat{\theta}_1 = \theta_1 + \psi$. The degraded output $\bar{Y}1$ due to the equivalent DOA tracking error can be written as $$\bar{Y}1 = \tag{54}$$

$$\sqrt{\frac{P_1}{2M}} R_1 E\{\alpha_1\} Re\left\{\sum_{m=0}^{M-1} \exp\left(j\left(\frac{2\pi dm}{\lambda}\sin(\theta_1 + \psi) - \frac{2\pi dm}{\lambda}\sin\theta_1\right)\right)\right\}.$$

The equivalent DOA error due to the mixer phase distortions can be determined by the following equation:

$$Re\left\{\frac{1 - e^{j\frac{2\pi dM}{\lambda}(\sin(\theta_1+\psi)-\sin\theta_1)}}{1 - e^{j\frac{2\pi d}{\lambda}(\sin(\theta_1+\psi)-\sin\theta_1)}}\right\} = \frac{M\sin\Omega}{\Omega} \tag{55}$$

where $\psi$ is the DOA error due to the mixer phase distortions. As a special case, let $\theta_1 = 0°$. Then, the equivalent DOA tracking errors due to the mixer phase distortions are listed in Table 2 for M=2, 3, 5, 7 antenna elements.

TABLE 2

Equivalent DOA tracking error due to the mixer phase distortions with mixer phase difference of range $\Omega = 60°$

| M | $\psi$ |
|---|---|
| 2 | 15.85° |
| 3 | 8.6° |
| 5 | 4.5 |
| 7 | 3.07° |

The tracking algorithm will work if the initial DOA guess is within the main lobe. The main lobe width of the beam pattern will affect the coarse acquisition time. The wider the main lobe width, the shorter the acquisition time. When the DOA is larger than 60° or less than −60°, the initial DOA search might take a wrong direction due to the poor resolution of the antenna array beam patern using the DOA. If the true DOA of the desired user is about 60°, a correlation output with a DOA guess in [−60°,−70°] might be higher than that with a guess of around 60° due to noise and MAI. This can be observed from FIG. 4. Fortunately a typical base station employs three sectors. Then, the DOAs for each sector can be reasonably restricted to within [−60°, 60°].

Figure 5:
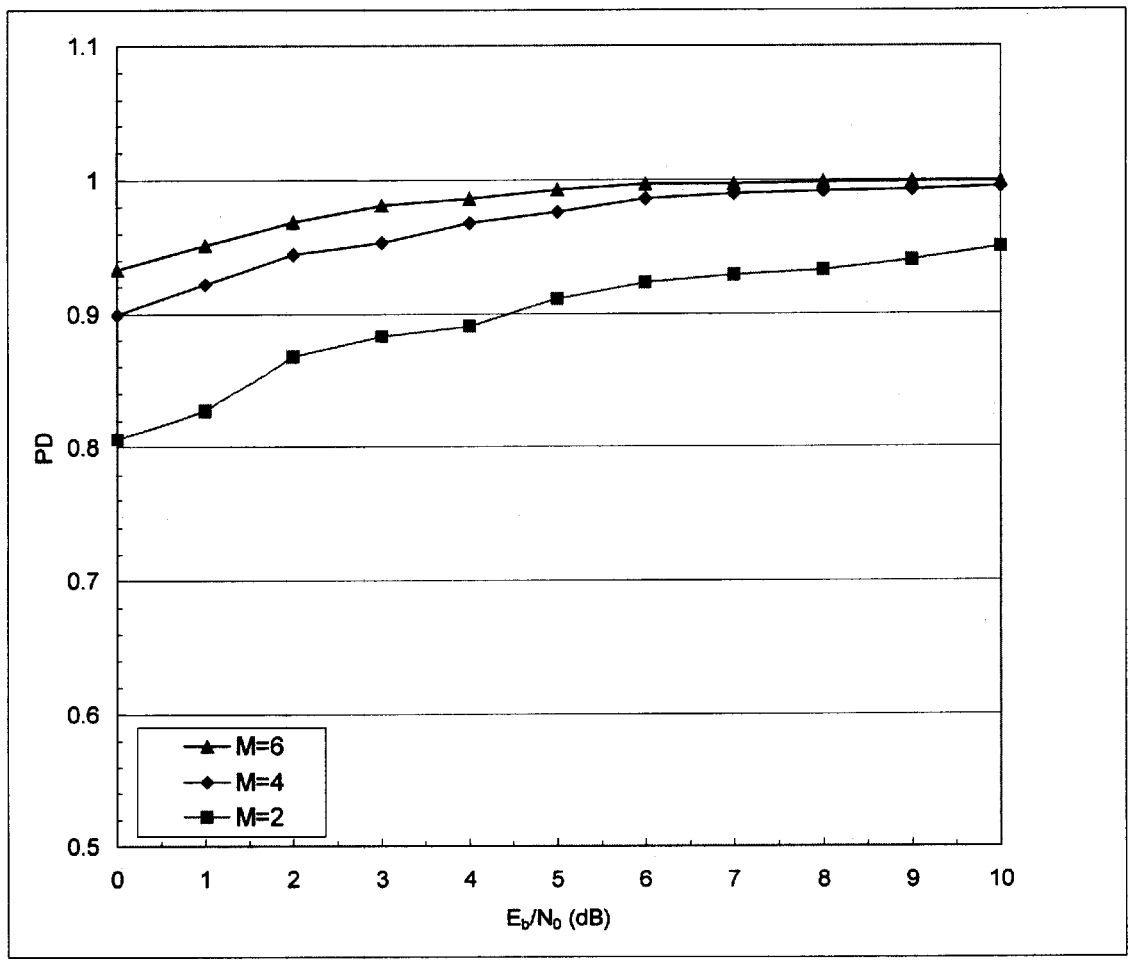
FIG. 5 is a graph of the probabilities of correct direction detection at the initial search versus the bit-energy-to-noise power spectrum density $E_b/N_0$ in dB for antenna arrays of 2, 4, and 6 elements, configured in accordance with one embodiment of the present invention.

FIG. 5 shows the probabilities of correct direction detection at the initial search versus the bit-energy-to-noise power spectral density ratio $E_b/N_0$ in dB for antenna arrays of 2, 4, and 6 elements. The $N_0$ represents thermal noise power spectral density in watts per Hertz. For simulation, binary phase shift keying (BPSK) modulation is employed. An antenna array of M=2 elements is used. A total of nine users are assumed by way of example in the system. The data rate is 9600 bps. The carrier frequency $f_c$ is 1.9 Giga Hertz. A Gold sequence of length 31 is used as the PN sequence. Under Rayleigh fading environment, the mobile speed V is set to 50 km/hour.

TABLE 3

List of the number of computations per snapshot for different smart antennas

| Adaptive algorithms | Number of complex computations/snapshot | |
| --- | --- | --- |
| | Multiplication | Addition |
| Least-Mean-Square (LMS) | 2M + 1 | 2M |
| Normalized LMS | 3M + 1 | 2M |
| Recursive Least-Square (RLS)* | $2M^2 + 3M$ | $2M^2 + 2M - 1$ |
| Optimum adaptive convergence parameter | 4M + 1 | 2M − 1 |
| Maximum output power criteria without Lagrange multiplier | 3M + 1 | 3M − 1 |
| Present invention** | 2M | 2M − 2 |
| D. Shim and S Choi blind adaptive algorithm | 5M + 1 | 3M − 1 |

*Direct RLS requires about $2M^2 + 5M$ operations per snapshot.
**The present invention does not update the DOA every chip or bit.

Table 3 compares the list of the number of computations per snapshot for different smart antenna algorithms where M is the number of antenna array elements. Table 3 shows that the present invention has a smaller number of computations per snapshot than most of the existing smart antenna algorithms.

Figure 6:
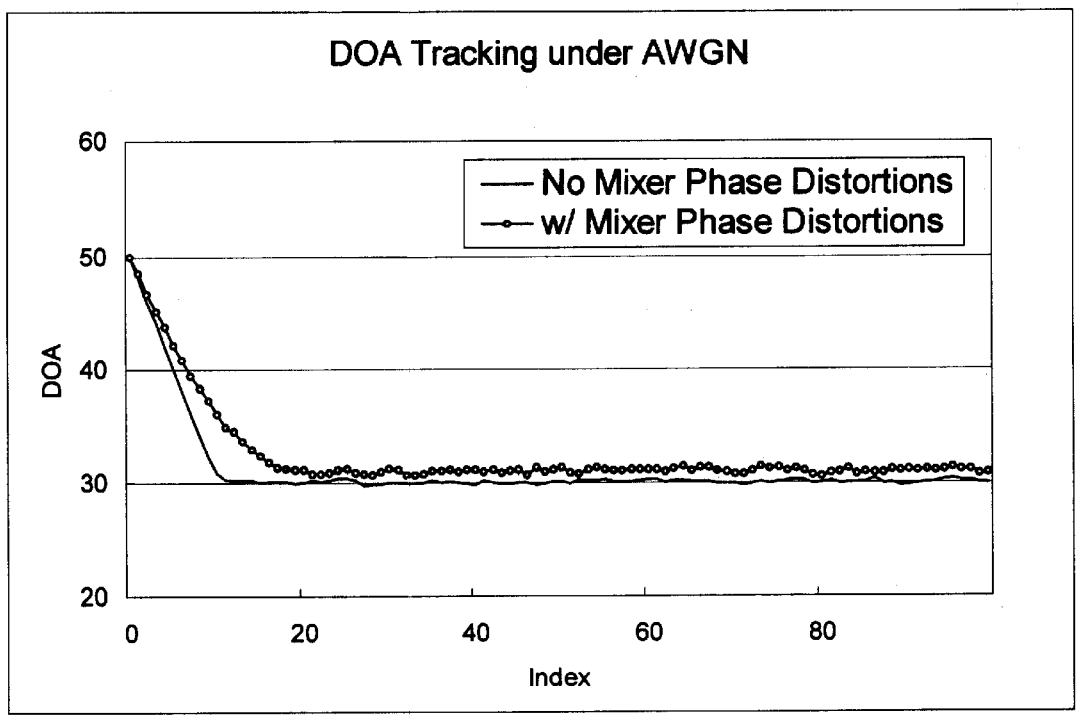
FIG. 6 shows simulation DOA tracking results versus iteration with averaging over 100 runs under an additive white Gaussian noise (AWGN) channel.
Figure 7:
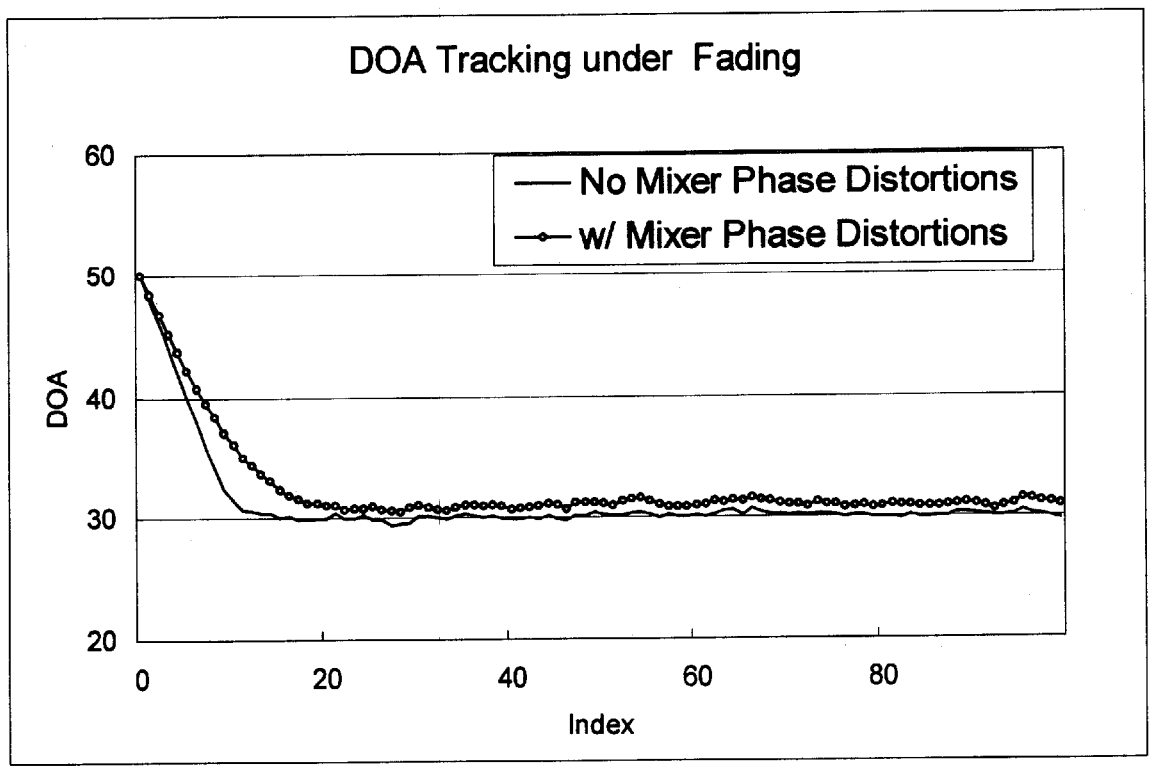
FIG. 7 shows simulation DOA tracking results versus iteration with averaging over 100 runs under a Rayleigh fading environment for one embodiment of the present invention.

By updating the DOA every L bits where L=20 bits were used throughout the invention, FIGS. 6 and 7 simulation test results for show the transient as well as steady state of the DOA tracking behavior under AWGN and Rayleigh fading environments, respectively, when M=2, $E_b/N_0$=6 dB, true DOA=30° and initial DOA estimation was 50°. In FIG. 7, mobile speed V=50 km/hour, and carrier frequency $f_c$=1.9 Giga Hertz. We observe that for both AWGN and fading environments, the proposed algorithm takes only about 10 and 18 iterations when the mixer phase distortions are absent and present, respectively.

Figure 8:
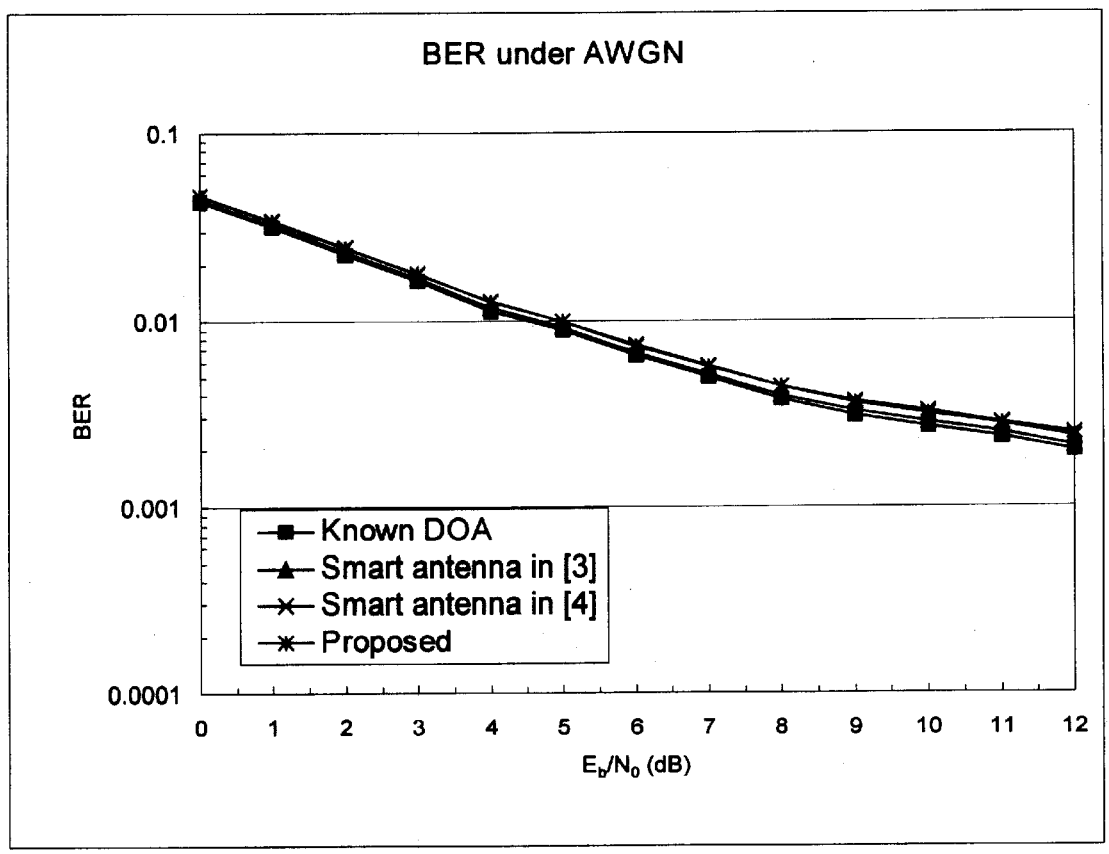
FIG. 8 shows simulation BER results versus $E_b/N_0$ under an AWGN environment for a smart antenna configured in accordance with one embodiment of the present invention.
Figure 9:
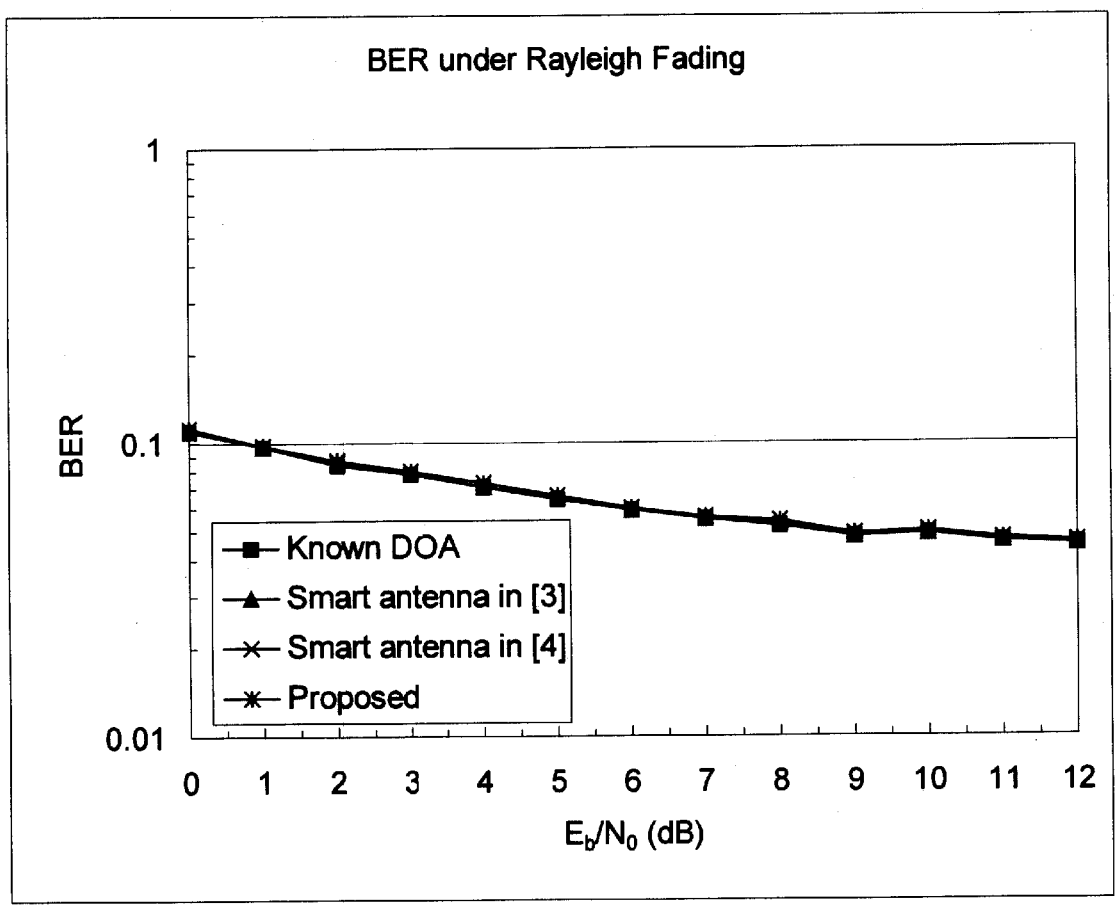
FIG. 9 shows simulation BER results versus $E_b/N_0$ under a Rayleigh fading environment for a smart antenna configured in accordance with one embodiment of the present invention.

FIGS. 8 and 9 show simulation BER results versus $E_b/N_0$ under AWGN and Rayleigh fading environments, respectively, by employing the present DOA tracking algorithm, maximum output criteria without Lagrange multiplier (3), and Shim and Choi's blind adaptive algorithm (4). The simulation results indicate that the smart antennas configured in accordance with one embodiment of the present invention have the same performance, compared to the other smart antenna algorithms. In these simulations, BPSK modulation is applied. M=2 antenna elements array is used. A total nine users are assumed in the system. The data rate is 9600 bps. The carrier frequency $f_c$ is 1.9 Giga Hertz. Walsh sequences of length 32 are used as the PN sequences. Under Rayleigh fading environment, the mobile speed V is set to 50 km/hour.

What is claimed is:

1. A method for acquiring a direction of arrival angle for an incoming spread spectrum signal comprising the steps of:
   initializing an estimated direction of arrival angle of an incoming spread spectrum signal;
   calculating a weight vector for a smart antenna array based on the estimated direction of arrival angle, the weight vector being matched to an array response vector for the antenna array;
   weighting signals received by the smart antenna array with the weight vector to form a weighted output without performing phase calibration;
   despreading the weighted output to form a despread output; and
   selecting the estimated direction of arrival angle as a direction of arrival angle based upon the despread output.

2. The method of claim 1, wherein the selecting step is performed by comparing the despread output to a threshold.

3. The method of claim 2, further comprising the steps of:
   updating the estimated direction of arrival angle if the estimated direction of arrival angle is not selected in the selecting step; and
   repeating the updating, calculating, weighting, and despreading steps if the estimated direction of arrival angle is not selected in the selecting step.

4. The method of claim 3, wherein the estimated direction of arrival angle is changed by a step size.

5. The method of claim 4, wherein the step size is approximately one half of a beamwidth of the incoming spread spectrum signal.

6. The method of claim 3, wherein the estimated direction of arrival angle is modified by randomly selecting a new direction of arrival angle within a sector corresponding to the smart antenna array.

7. The method of claim 1, wherein the estimated direction of arrival angle is initialized to correspond to a boundary of a sector in the initializing step.

8. The method of claim 7, further comprising the steps of updating the estimated direction of arrival angle by a step angle and repeating the updating, calculating, weighting, and despreading, steps until the estimated direction of arrival angle has traversed the sector.

9. The method of claim 8, wherein the step angle is approximately one half of a beamwidth of the incoming spread spectrum signal.

10. The method of claim 8, wherein the selecting step is performed by selecting the estimated direction of arrival angle corresponding to the largest despread output from among all estimated direction of arrival angles in the sector.

11. The method of claim 1, wherein the array is linear.

12. The method of claim 11, wherein each element of the weight vector is calculated according to an equation of the form $$\underline{W}_M = Ce^{-j\frac{2\pi dM}{\lambda}\sin\theta_1}$$

where $\underline{W}_M$ is a weight for Mth element of the array, C is a constant, M is an antenna array element number, $\lambda$ is a wavelength of the incoming spread spectrum signal, d is an antenna array element spacing, and $\theta_1$ is the estimated direction of arrival angle.

13. The method of claim 11, wherein the weight vector is calculated according to an equation of the form $$\underline{W} = \frac{1}{\sqrt{M}}\left[1, e^{-j\frac{2\pi d}{\lambda}\sin\theta_1}, \ldots, e^{-j\frac{2\pi d(M-1)}{\lambda}\sin\theta_1}\right]^T$$

wherein $\underline{W}$ is the weight vector, M is an antenna array element number, $\lambda$ is a wavelength of the incoming spread spectrum signal, d is an antenna array element spacing, $\theta_1$ is the estimated direction of arrival angle, and T is the transpose.

14. The method of claim 1, wherein an imaginary portion of the despread output is not used in the selecting step.

15. The method of claim 1, wherein both a real and an imaginary portion of the despread output is used in the selecting step.

16. The method of claim 1, wherein the incoming spread spectrum signal is a code division multiple access signal.

17. The method of claim 1, wherein the incoming spread spectrum signal is a pilot channel signal.

18. The method of claim 17, wherein the despread output is multiplied by a pilot symbol pattern.

19. The method of claim 1, wherein the incoming spread spectrum signal is multiplied by a tentative decision feedback bit.

20. The method of claim 1, wherein the signals weighted in the weighting step are collected over a bit period.

21. A method for tracking a direction of arrival angle comprising the steps of:

initializing an estimated direction of arrival angle of an incoming spread spectrum signal;

forming a first trial angle, the first trial angle being spaced apart from the estimated direction of arrival angle by a first angular difference in a first direction;

calculating a first weight vector for a smart antenna array based on the first trial angle, the first weight vector being matched to an array response vector for the antenna array;

weighting signals received by the smart antenna array with the first weight vector to form a first weighted output without performing phase calibration;

despreading the first weighted output to form a first despread output; and selecting the first trial angle as a new direction of arrival angle based upon the first despread output.

22. The method of claim 21, further comprising the steps of:

forming a second trial angle, the second trial angle being spaced apart from the estimated direction of arrival angle by a second angular difference in a second direction, the second direction being different from the first direction;

calculating a second weight vector for a smart antenna array based on the second trial angle, the second weight vector being matched to an array response vector for the antenna array;

weighting signals received by the smart antenna array with the second weight vector to form a second weighted output; and despreading the second weighted output to form a second despread output;

wherein the selecting step is performed by selecting the first trial angle as a new estimated direction of arrival angle if the first despread output is larger than the second despread output, selecting the second trial angle as a new estimated direction of arrival angle if the second despread output is larger than the first despread output, and otherwise leaving the estimated direction of arrival angle unchanged.

23. The method of claim 21, further comprising the steps of repeating the forming, calculating, weighting, despreading and selecting steps until a loss of tracking is detected.

24. The method of claim 22, further comprising the steps of repeating the forming, calculating, weighting, despreading and selecting steps until a loss of tracking is detected.

25. The method of claim 21, wherein the selecting step is performed by comparing the first despread output to a threshold.

26. The method of claim 21, wherein the first angular difference is approximately equal to ten percent of an angle error of the smart antenna array.

27. The method of claim 21, wherein the smart antenna array is linear.

28. The method of claim 27, wherein each element of the first weight vector is calculated according to an equation of the form $$\underline{W}_M = C e^{-j \frac{2\pi dM}{\lambda} \sin\theta_1}$$

where $\underline{W}_M$ is a weight for Mth element of the array, C is a constant, M is an antenna array element number, $\lambda$ is a wavelength of the incoming spread spectrum signal, d is an antenna array element spacing, and $\theta_1$ is the first trial angle.

29. The method of claim 27, wherein the first weight vector is calculated according to an equation of the form $$\underline{W} = \frac{1}{\sqrt{M}} \left[ 1, e^{-j \frac{2\pi d}{\lambda} \sin\theta_1}, \ldots, e^{-j \frac{2\pi d(M-1)}{\lambda} \sin\theta_1} \right]^T$$

wherein $\underline{W}$ is the first weight vector, M is an antenna array element number, $\lambda$ is a wavelength of the incoming spread spectrum signal, d is an antenna array element spacing, $\theta_1$ is the first trial angle, and T is the transpose.

30. The method of claim 21, wherein an imaginary portion of the first despread output is not used in the selecting step.

31. The method of claim 21, wherein both a real and an imaginary portion of the first despread output is used in the selecting step.

32. The method of claim 21, wherein the incoming spread spectrum signal is a code division multiple access signal.

33. The method of claim 21, wherein the incoming spread spectrum signal is a pilot channel signal.

34. The method of claim 33, wherein the despread output is multiplied by a pilot symbol pattern.

35. The method of claim 21, wherein the incoming spread spectrum signal is multiplied by a tentative decision feedback bit.

36. The method of claim 24, wherein a loss of tracking is detected by comparing a bit error rate for the incoming spread spectrum signal to a threshold.

37. The method of claim 24, wherein a loss of tracking is detected by comparing a frame error rate for the incoming spread spectrum signal to a threshold.

38. The method of claim 24, wherein a loss of tracking is detected by comparing a signal strength to a threshold.

39. A method for acquiring a direction of arrival angle for an incoming spread spectrum signal comprising the steps of:

initializing an estimated direction of arrival angle of an incoming code division multiple access spread spectrum signal to correspond to a boundary of a sector;

calculating a weight vector for a smart antenna array based on the estimated direction of arrival angle, the weight vector being matched to an array response vector for the antenna array;

weighting signals received by the smart antenna array over a symbol period with the weight vector to form a weighted output without performing phase calibration;

decorrelating the weighted output to form a decorrelated output;

multiplying the decorrelated output by a symbol bit corresponding to a symbol represented by the incoming code division multiple access spread spectrum signal during the symbol period to form a despread output;

changing the estimated direction of arrival angle by a step size approximately equal to one half of a beamwidth of the incoming code division multiple access spread spectrum signal and repeating the calculating, weighting, decorrelating, and multiplying steps for each estimated direction of arrival angle until the sector has been traversed;

selecting the estimated direction of arrival angle corresponding to the largest despread output as the direction of arrival angle.

40. The method of claim 39, wherein the array is linear and the weight vector is calculated according to an equation of the form $$\underline{W} = \frac{1}{\sqrt{M}} \left[ 1, e^{-j\frac{2\pi d}{\lambda}\sin\theta_1}, \ldots, e^{-j\frac{2\pi d(M-1)}{\lambda}\sin\theta_1} \right]^T$$

wherein $\underline{W}$ is the weight vector, M is an antenna array element number, $\lambda$ is a wavelength of the incoming spread spectrum signal, d is an antenna array element spacing, $\theta_1$ is the estimated direction of arrival angle, and T is the transpose.

41. The method of claim 40, wherein only a real portion of the decorrelated output is multiplied by the symbol bit to form the despread output.

42. The method of claim 41, wherein the incoming spread spectrum signal is a pilot channel signal and the symbol bit corresponds to a pilot symbol pattern.

43. The method of claim 41, wherein the symbol bit corresponds to a tentative decision feedback bit.

44. A method for tracking a direction of arrival angle comprising the steps of:

initializing an estimated direction of arrival angle of an incoming spread spectrum signal to a value within a main lobe of the incoming spread spectrum signal;

forming a first trial angle, the first trial angle being spaced apart from the estimated direction of arrival angle by a step angle in a first direction;

forming a second trial angle, the second trial angle being spaced apart from the estimated direction of arrival angle by the step size in a second direction;

calculating first and second weight vectors for a smart antenna array based on the first and second trial angles, respectively, the weight vectors being matched to an array response vector for the antenna array;

weighting signals received by the smart antenna array during a symbol period with the first and second weight vectors to form a first and second weighted outputs without performing phase calibration;

decorrelating the first and second weighted outputs to form first and second decorrelated outputs;

multiplying a real portion of the first and second decorrelated outputs by a symbol bit corresponding to a symbol represented by the incoming code division multiple access spread spectrum signal during the symbol period to form first and second despread outputs;

selecting the first trial angle as a new estimated direction of arrival angle if the first despread output is larger than the second despread output, selecting the second trial angle as a new estimated direction of arrival angle if the second despread output is larger than the first despread output, and otherwise leaving the estimated direction of arrival angle unchanged; and repeating the calculating, weighting, decorrelating, multiplying, and selected steps until a loss of tracking is detected.

45. A method for tracking a direction of arrival angle for a signal comprising the steps of:

estimating an estimated direction of arrival angle;

calculating a weight vector for an antenna array comprising a plurality of antenna elements by matching the weight vector to an antenna array response vector based on the estimated direction of arrival angle;

obtaining a signal weighted by the weight vector from the antenna array without performing phase calibration;

updating the estimated direction of arrival angle based on a parameter of the signal.

46. An apparatus for acquiring a direction of arrival angle for an incoming spread spectrum signal, the apparatus comprising:

a processor connectable to a smart antenna array, the processor being configured to perform the steps of initializing an estimated direction of arrival angle of an incoming spread spectrum signal;

calculating a weight vector for the smart antenna array based on the estimated direction of arrival angle, the weight vector being matched to an array response vector for the antenna array; weighting signals received by the smart antenna array with the weight vector to form a weighted output without performing phase calibration;

despreading the weighted output to form a despread output; and selecting the estimated direction of arrival angle as a direction of arrival angle based upon the despread output.

47. The apparatus of claim 46, further comprising a smart antenna array connected to the processor.

48. An apparatus for tracking a direction of arrival angle, the apparatus comprising:

a processor connectable to a smart antenna array, the processor being configured to perform the steps of initializing an estimated direction of arrival angle of an incoming spread spectrum signal;

forming a first trial angle, the first trial angle being spaced apart from the estimated direction of arrival angle by a first angular difference in a first direction;

calculating a first weight vector for a smart antenna array based on the first trial angle, the first weight vector being matched to an array response vector for the antenna array;

weighting signals received by the smart antenna array with the first weight vector to form a first weighted output without performing phase calibration;

despreading the first weighted output to form a first despread output; and selecting the first trial angle as a new direction of arrival angle based upon the first despread output.

* * * * *